(12) United States Patent
Agranat

(10) Patent No.: US 7,782,195 B2
(45) Date of Patent: Aug. 24, 2010

(54) APPARATUS FOR SCHEDULED LOW POWER AUTONOMOUS DATA RECORDING

(75) Inventor: Ian Agranat, Concord, MA (US)

(73) Assignee: Wildlife Acoustics, Inc., Concord, MA (US)

( * ) Notice: Subject to any disclaimer, the term of this patent is extended or adjusted under 35 U.S.C. 154(b) by 344 days.

(21) Appl. No.: 12/051,421

(22) Filed: Mar. 19, 2008

(65) Prior Publication Data

US 2009/0237241 A1 Sep. 24, 2009

(51) Int. Cl.
G08B 21/00 (2006.01)
(52) U.S. Cl. .................. 340/540; 340/693.3; 340/3.3; 340/825.24; 340/7.32; 119/174; 381/124
(58) Field of Classification Search ................ 340/540, 340/573.1, 573.2, 693.1, 693.3, 693.4, 3.3, 340/3.31, 825.22, 825.24, 7.32; 704/270, 704/211, 201; 119/174; 381/61, 124
See application file for complete search history.

(56) References Cited

U.S. PATENT DOCUMENTS

| | | | |
|---|---|---|---|
| 4,479,239 A | 10/1984 | Rhines | |
| 4,640,134 A | 2/1987 | Simmons | |
| 4,806,931 A | 2/1989 | Nelson | |
| 4,876,721 A | 10/1989 | Kerr et al. | |
| 5,036,538 A | 7/1991 | Oken et al. | |
| 5,056,145 A | 10/1991 | Yamamoto et al. | |
| 5,168,830 A | 12/1992 | Deglis | |
| 5,239,587 A * | 8/1993 | Muckelrath | 381/56 |
| 5,452,364 A | 9/1995 | Bonaham et al. | |

(Continued)

FOREIGN PATENT DOCUMENTS

CA 2089597 A 8/1994

(Continued)

OTHER PUBLICATIONS

Anderson, Sven, "Speech Recognition Meets Bird Song: A Comparison of Statistics-Based and Template Based Techniques," Journal of Acoustical Society of America [online] vol. 106m No. 4, Oct. 1999, pp. 1-26, XP002304492 Retrieved from the Internet: URL:http://turing.bard.edu/~sven/papers/Birdsong.pdf retrieved on Mar. 20, 2009.

(Continued)

Primary Examiner—Toan N Pham
(74) Attorney, Agent, or Firm—Lando & Anastasi, LLP

(57) ABSTRACT

A method and apparatus for powering a device, such as a data recorder or other device, according to an adjustable schedule. One example of the apparatus includes a programmable timer having an alarm output, a power regulator having an enable input coupled to the alarm output, a controller coupled to the power regulator and to the programmable timer, the controller being configured to receive operating power from the power regulator, and a powered device coupled to the power regulator and configured to receive power from the power regulator. The regulator has an operating state in which the operating power is provided to the powered device and an idle state in which the operating power is not provided to the powered device. The regulator is configured to be activated into the operating state by activation of the alarm output and deactivated into the idle state by deactivation of the alarm output, under the control of the controller.

20 Claims, 4 Drawing Sheets

U.S. PATENT DOCUMENTS

| | | | |
|---|---|---|---|
| 5,893,057 | A | 4/1999 | Fujimoto et al. |
| 5,956,463 | A | 9/1999 | Patrick et al. |
| 6,087,960 | A | 7/2000 | Koyouno et al. |
| 6,396,402 | B1 | 5/2002 | Berger et al. |
| 6,546,368 | B1 | 4/2003 | Weniger et al. |
| 7,082,394 | B2 | 7/2006 | Burges et al. |
| 2001/0044719 | A1 | 11/2001 | Casey |
| 2003/0088400 | A1 | 5/2003 | Nishio et al. |
| 2003/0115215 | A1 | 6/2003 | Swarovski |
| 2004/0107104 | A1 | 6/2004 | Schaphorst |
| 2007/0033010 | A1* | 2/2007 | Jones .................... 704/201 |
| 2007/0291123 | A1* | 12/2007 | Cole ................ 348/207.11 |

FOREIGN PATENT DOCUMENTS

| | | |
|---|---|---|
| EP | 0629996 A2 | 12/1994 |

OTHER PUBLICATIONS

Anonymous, "The Basics of Microphones" [online] Apr. 26, 2003, pp. 1-4, XP002304494 retrieved from the internet: http://www.nrgresearch.com/microphonestutorial.htm retrieved on Mar. 20, 2009.

Anderson, S.E., et al., Department of Organismal Biology and Anatomy, University of Chicago, Automatic Recognition and Analysis of Birdsong Syllables from Continuous Recordings, Mar. 8, 1995.

Clemins, P. Johnson M. "Application of speech recognition to african elephant vocalizations" Acoustics, Speech and Signal Processing vol. 1, Apr. 2003, pp. 484-487.

El Gayar, N. et al., Fuzzy Neural Network Models for High-Dimensional Data Clustering, ISFL '97, Second International ICSC Sumposium on Fuzzy Logical and Applications ICSC Academic Press, Zurich, Switzerland, pp. 203-209, Feb. 12, 1997.

Franzen, A. Gu i. "Classification of bird species by using key song searching: a comparative study" Systems, Man and Cybernetics, vol., Oct. 2003, pp. 880-887.

Harma, Aki, "Automatic Identification of Bird Species Based pm Sinusoidal Modeling of Syllables", IEEE Int. Conf. Acoustics, Speech, Signal Processing (ICASSP 2003), Hong Kong, Apr. 2003.

Kogan, Joseph A. and Margoliash, Automated Recognition of bird song elements from continuous recordings using dynamic time warping and hidden Markov models: A Comparative Study, J. Acoust. Soc. Am. (4), Apr. 1998.

Kunkel, Gregory J., The Birdsong Project, Western Catskills of New York State; 1996-2004 http://ourworld.compuserve.com/homepages/G_Kunkel/project/Project.htm Jun. 22, 2004.

Lleida, L. et al., Robust Continuous Speech Recognition System Based on a Microphone Array, IEEE International Conference on Seattle, WA, pp. 241-244, May 12, 1998.

McIlraith, Alex L. and Card, Howard C., Birdsong Recognition Using Backpropagation and Multivariate Statistics, IEEE Transactions on Signal Processing, vol. 45, No. 11, Nov. 1997.

Suksmono, A.B., et al., Adaptive Image Coding Based on Vector Quantization Using SOFM-NN Algorithm, IEEE APCCAS (Asia-Pacific Conference on Chiangmai, Thailand, pp. 443-446, Nov. 1998.

Wilde, Mark and Vipin Menon, "Bird Call Recognition using Hidden Markov Models" 2003.

* cited by examiner

APPARATUS FOR SCHEDULED LOW POWER AUTONOMOUS DATA RECORDING

BACKGROUND

1. Field of Invention

The present invention is directed to battery-operated, autonomous data recording devices, more particularly, to low power devices that can be configured to operate on a recording schedule.

2. Discussion of Related Art

There are many applications for automated data collection. In particular, the collection of audio data in the field can be used to monitor populations of wildlife such as birds, bats, frogs and whales for presence, absence, and abundance data for specific species.

One of the greatest challenges in the deployment of data collection equipment in the field is the scarcity of power. Remote locations may not have access to power from utilities, and therefore, batteries are generally required to power data collection devices. Supplemental solar power may not be practical as solar systems tend to be heavy and expensive, and there may not be sufficient light in many installations. Weight can also be an important consideration for equipment that is moved from one remote location to the next, further limiting the size and capacity of batteries that can be used. Given the finite capacity of any battery power supply, the data recorder will only be able to operate for a limited period of time. The lower the amount of power consumed by the data recorder, the longer the recorder can operate and the more data can be collected before manual intervention (e.g. to replace batteries) is required.

One approach to extending the operating life of automated data collection systems is to configure the systems to record on a schedule rather than continuously. In most cases, the power consumed for actual data recording is significantly greater than the power consumed to remain idle during scheduled down time. This approach is especially well suited to wildlife monitoring as different species are more likely to vocalize at certain times of day. For example, many species of birds sing at dawn while many species of frogs sing after dusk.

However, conventional implementations of the above approach are not ideal as significant power is still consumed during the idle periods and the scheduling capabilities are limited. For example, referring to FIG. 1, there is illustrated an example of a conventional system discussed in an article entitled "The Use of Automated Data-Acquisition Techniques in Monitoring Amphibian and Reptile Populations," by Charles R. Peterson and Michael E. Dorcas, Department of Biological Sciences, Idaho State University, and published on pages 369-378 in McCullough, D. R. and R. Barrett, 1992, Wildlife 2001: Populations, Elsevier Applied Science, London. According to the Peterson and Dorcas article, the system makes use of a series of interval timers 102 that trigger a relay 103 to power an off-the-shelf audio recorder 104. Power is supplied by a battery 101. One disadvantage of this system is that the relay 103 consumes extra power exceeding several milliwatts. Another disadvantage of this system is that the simple timers 102 provide limited programming flexibility. For example, the timers 102 are unable to accurately track the time of sunrise for given latitudes and times of year, to implement more complex sampling protocols, or to combine different protocols for the simultaneous monitoring of different species.

Referring to FIG. 2, there is illustrated a block diagram of a subsequent version of the system of FIG. 1. The system of FIG. 2 includes a microprocessor-based controller 202 to control power to the off-the-shelf audio recorder 104 using an efficient solid state power regulator 203. While this approach improves the programming flexibility of the system, the microprocessor-based controller consumes several milliwatts of power, even when idle.

In another implementation, an autonomous recording unit (developed by the Bioacoustics Research Program at the Cornell Lab of Ornithology) comprises an audio data recorder integrated with a controller by sharing a microprocessor. The microprocessor implements a recording schedule and directs the acquisition and storage of audio data. The integration of the data recorder and the controller represents an improvement of efficiency over the systems discussed above in reference to FIGS. 1 and 2 by reducing the number of active components in the design. However, the microprocessor remains powered during idle periods and continues to consume power.

SUMMARY

Aspects and embodiments are directed to a system for scheduled autonomous data recording that uses almost no power when idle between scheduled recording periods. In one example, power consumption in the system may be reduced during data recording by combining redundant functional elements of the data recorder and the controller. In addition, the system may provide for highly flexible scheduling, as discussed further below.

According to one embodiment, an apparatus for autonomous data recording comprises a timer with a data interface and an alarm output, a power regulator with an enable input activated by the alarm output, a controller powered by the output of the power regulator and interfacing to the timer using the data interface, and a data recorder powered by the output of the power regulator. In one example, the data recorder is an audio recorder. In another example, the controller may configure the timer to deactivate the alarm output for a period of time causing the regulator to be disabled and power to be disconnected from the controller until the time period elapses. The apparatus may further comprise a switch to manually override the enable input to the regulator. In another example, the controller comprises a microprocessor, and the timer and power regulator are integrated with the microprocessor such that idle portions of the microprocessor are powered down during idle periods. Optionally, the data recorder and the controller can share a microprocessor.

According to another embodiment, an apparatus for autonomous data recording comprises a programmable timer having a programming interface and an alarm output, a power regulator having an enable input coupled to the alarm output, a power input and a power output, a power source coupled to the power input of the regulator, a controller coupled to the power output of the power regulator and to the programming interface of the programmable timer, and a data recorder coupled to the power output of the power regulator. The power regulator has an operating state in which power is provided at the power output and an idle state. The power regulator is activated into the operating state by activation of the alarm output and deactivated into the idle state by deactivation of the alarm output. In one example, the data recorder is an audio recorder. In another example, the controller is configured to program the programmable timer, via the programming interface, to deactivate the alarm signal for a predetermined period of time. The apparatus may further comprise a switch coupled between the power regulator and the programmable timer, the switch having an ON position and an OFF position and being configured to activate the enable input of the regulator when in the ON position. In another example, the controller comprises a microprocessor. Optionally, the microprocessor may be shared between the controller and the data recorder. In another example, the controller comprises a first oscillator having a first operating frequency, and the timer comprises a second oscillator having a second operating frequency. The first operating frequency is higher than the second operating frequency. The programmable timer may be a single stage timer or a multi-stage timer. In one example where the timer is a multi-stage timer, the controller is configured to program the multi-stage timer to implement a multi-stage timing schedule including a first stage in which the controller is configured to program the programmable timer, via the programming interface, to deactivate the alarm signal for a first predetermined period of time, and a second stage in which the controller is configured to program the programmable timer, via the programming interface, to deactivate the alarm signal for a second predetermined period of time.

Another embodiment is directed to a method of controlling a data recorder including a controller, a power regulator and a timer. The method comprises programming the timer to activate the power regulator for a predetermined recording time period, providing power from the power regulator to the controller during the predetermined recording time period, and powering down the controller when the predetermined recording time period expires by deactivating the power regulator. In one example, programming the timer includes programming the timer with the controller. In another example, the method further comprises providing power from the power regulator to a recording device during the predetermined recording time period. The method may further comprise recording data with the recording device during the predetermined recording time period.

According to another embodiment, an apparatus comprises a programmable timer having a programming interface and an alarm output, a power regulator having an enable input coupled to the alarm output, a power input and a power output, a power source coupled to the power input of the regulator, a controller coupled to the power output of the power regulator and to the programming interface of the programmable timer, the controller being configured to receive operating power from the power regulator, and a powered device coupled to the power output of the power regulator and configured to receive power from the power regulator. The regulator has an operating state in which the operating power is provided at the power output and an idle state in which the operating power is not provided at the power output, and is activated into the operating state by activation of the alarm output and deactivated into the idle state by deactivation of the alarm output. The controller is configured to program the programmable timer, via the programming interface, to deactivate the alarm signal for a predetermined period of time.

Another embodiment is directed to a method of powering a device including a controller, a power regulator and a timer. The method comprises programming the timer with the controller to activate the power regulator for a predetermined active time period, providing power from the power regulator to the controller during the predetermined active time period, providing power from the power regulator to the device during the predetermined active time period, and powering down the controller and the device when the predetermined active time period expires by deactivating the power regulator. In one example, providing power from the power regulator to the device includes providing power to a data recorder during the predetermined active time period. In another example, the method further comprises recording data with the data recorder during the predetermined active time period to provide recorded data. The method may also comprise analyzing the recorded data to determine information, and adjusting at least one of a duration and a start time of the predetermined active time period responsive to the information.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

Aspects and embodiments of the invention are described in detail below with reference to the accompanying drawings. It is to be appreciated that the drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
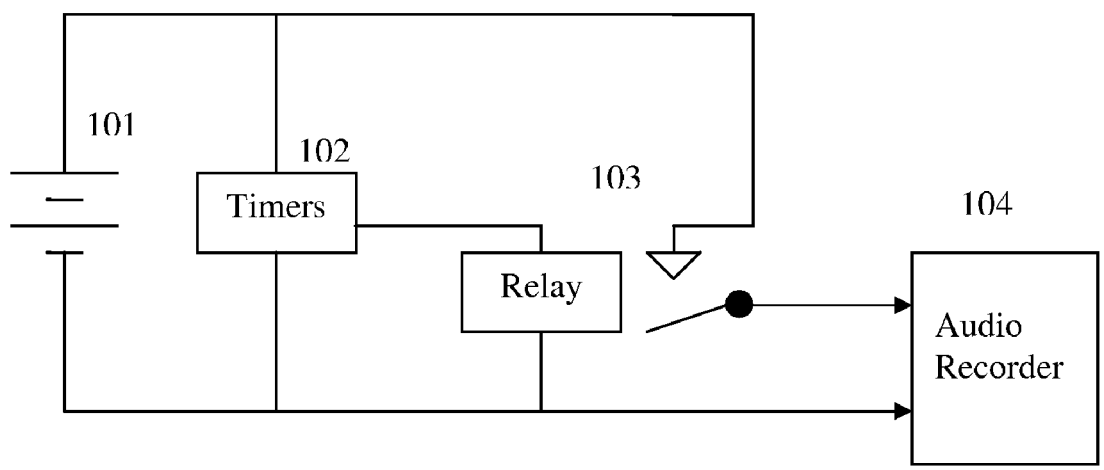
FIG. 1 is a block diagram of one example of a conventional data collection device.

Aspects and embodiments of the present invention are directed to a data collection device, and make use of a low-power programmable digital timer configured to enable power supply to the remaining components in the system. The data collection device operates on a schedule, having active periods (during which the device is recording) and idle periods during which a majority of the device components may be powered down. According to one embodiment, during idle periods, the power supply control circuit and the programmable digital timer are the only portions of the system consuming power, as discussed further below. Using commercially available timers (such as real-time clock integrated circuits) and power regulators, the amount of idle power consumed may be generally only a few microwatts. In addition, in one embodiment, a microprocessor-based controller is used to implement a highly flexible recording schedule, as discussed further below.

Unlike conventional systems, the controller in system according to embodiments of the invention may be powered only during scheduled recording periods and during initial programming of the schedule or other maintenance operations. The controller, in turn, may program the digital timer to disconnect its own power until the next scheduled event occurs, as discussed further below. A manual switch may be provided to override the digital timer and force power to the controller for initial programming of the schedule or other maintenance operations. In addition, the same controller may also acquire and store data, rather than making use of a separate microprocessor-based data acquisition system, to eliminate the duplication of active components such as microprocessors, computer memories and other peripherals.

It is to be appreciated that this invention is not limited in its application to the details of construction and the arrangement of components set forth in the following description or illustrated in the drawings. The invention is capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments. In addition, it is to be appreciated that the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Figure 3:
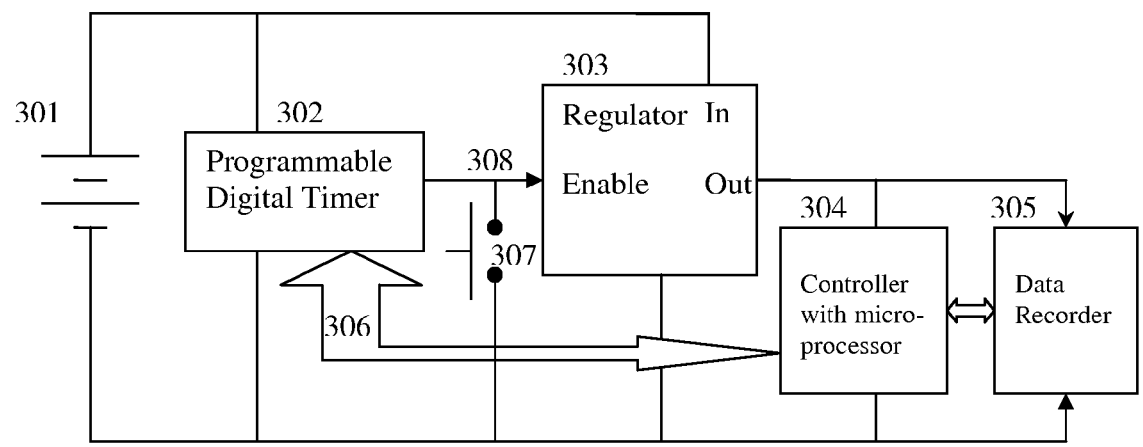
FIG. 3 is a diagram of one embodiment of a data collection device, according to aspects of the invention.

Referring to FIG. 3, there is illustrated a block diagram of one example of a data collection device according to aspects of the invention. In the illustrated embodiment, a battery 301 provides power to a programmable digital timer 302 and a power regulator 303. The power regulator 303 has an enable signal 308 to enable or disable the flow of current to a microprocessor-based controller 304 and to a data recorder 305. The enable signal 308 for the regulator 303 may be generated by either the timer 302 or a manual switch 307, as discussed further below. It is to be appreciated that in some embodiments, the apparatus (including the controller 304, timer 302 and power regulator 303) may also be used to controllably power a device other than a data recorder.

The timer 302 may be very simple low-power device, such as a simple up or down counter with a comparator, or a real-time clock integrated circuit chip. There are commercially available real-time clock chips that consume only a few microwatts of power and that are capable of generating an alarm signal at a particular date and time. One embodiment of the data collection system incorporates such a real-time clock chip as the timer 302, and the alarm signal from the timer can be used as the enable signal 308 to the regulator 303. Additionally, according to one embodiment, the timer 302 has a digital data interface 306 such as SPI or I²C, such that it can be programmed by the controller 304 (e.g., using a microprocessor included in the controller). For example, the controller 304 may read or set the current time, turn on or off the alarm signal, or set the time of the next alarm.

As discussed above, in one example, the switch 307 may be configured to manually override the enable signal 308 such that an operator can force the regulator 303 to provide power to the controller 304 for initial programming, configuration and maintenance. The switch 307 may be implemented as a button, "flip switch," lever, or any other device that can be activated by an operator. Once powered up, the controller 304 may program the timer 302 to activate the enable signal 308 so that the switch 307 no longer needs to be on to keep the controller powered up. In FIG. 3, the switch 307 is shown connecting an active-low enable signal (308) to ground, and a typical implementation may also employ a pull-up resistor (not shown) on the enable signal (308). However, it is to be appreciated that the invention is not limited to implementation illustrated in FIG. 3, and an equivalent circuit may be implemented for an active-high enable signal.

Still referring to FIG. 3, in one embodiment, the controller 304 can optionally control the data recorder 305, for example, to start and stop data collection. According to one embodiment, the controller 304 may program the timer 302 with a predetermined schedule, for example, to activate the enable signal 308 at specified time intervals (e.g., every two or three hours), or every day at some specified time (e.g., dawn or dusk), and to keep the enable signal activated for a specified time (e.g., one hour). It is to be appreciated that the controller 304 may also program (or re-program) the timer 302 between recording events so as to implement an arbitrary recording schedule. In one example, after finishing a scheduled recording, the controller 304 may program the timer 302 to release the enable signal 308 until the next scheduled recording time, thereby powering down the power regulator 302 and components (including the controller itself) coupled thereto.

As discussed above, the controller 304 may program or re-program the timer 302 at any time when the controller is active, allowing for a highly flexible recording schedule to be implemented. In one example, the controller 304 can program the timer 302 with a predetermined schedule, as discussed above. In this example, there may be no need for the controller 304 to reprogram the timer 302 every time the controller is activated; however, the controller 304 may make adjustments to the schedule as needed or desired. For example, as discussed above, the controller 304 may program the timer 302 with a schedule that implements recording at a particular time of day (e.g., dawn, dusk, etc.). In this case (or similar instances), the controller may be programmed to account for seasonal changes in the times of dawn and dusk, and to reprogram the timer accordingly. The timer 302 may be a single-stage or multi-stage timer. Where the timer 302 is a multi-stage timer, the controller 304 may program the timer with a schedule that varies by time period. For example, the controller 304 may program the timer 302 to record at a one time, or for one time period, on certain days of the week, and at another time, or for another time period, on other days of the week. Any of these schedules may be adjusted by the controller 304 whenever it is active, thus allowing for highly flexible timing.

According to one embodiment, when the enable signal 308 is deactivated, power to the power regulator 302, and therefore, also the controller 304 and data recorder 305, is turned off. Thus, the power consumption during idle periods is minimized because only the timer 302 remains powered. Because the controller 304 programs the timer 302 to reactivate the enable signal at a specified time, there is no need for the controller to remain active during the idle period. This ability to implement highly flexible, even arbitrary, timing while also enabling the controller, which controls the timing, to be powered down during idle periods may be a significant improvement over conventional systems in which a controller remains powered during idle periods.

According to one embodiment, the data recorder 305 will include data acquisition hardware such as sensors, amplifiers, filters, and analog-to-digital converters. The data recorder may also include a microprocessor to read samples from the data acquisition hardware, a storage device to format and store the acquired data, such as a disk drive, flash memory or magnetic media, and computer memory for storing microprocessor instructions. In some examples, the controller 304 will also include a microprocessor and computer memory. Therefore, according to one embodiment, power consumption can be further reduced by combining these common elements from the controller 304 and data recorder 305 into one integrated system.

Figure 4:
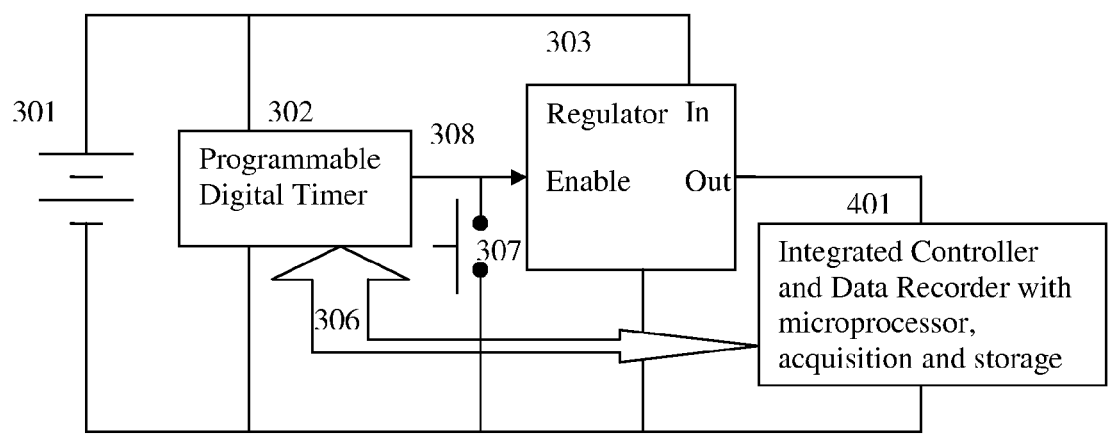
FIG. 4 is a diagram of another embodiment of data collection device including an integrated controller and data recorder, according to aspects of the invention.

Referring to FIG. 4, there is illustrated one example of a system including an integrated controller and data recorder, according to aspects of the invention. As shown in FIG. 4, the enable signal 308 from the power regulator 303 is used to enable or disable the flow of current to the integrated controller and data recorder 401, and operation of the system illustrated in FIG. 4 is similar to operation of the system illustrated in FIG. 3.

As discussed above, the controller 304 may have the ability to arbitrarily reprogram the timer 302 at any time when the controller is active, thus implementing dynamic, flexible timing or scheduling. In one example, the controller 304 may apply a sampling heuristic to a recording schedule. For example, the microprocessor may analyze recorded data to determine the location within a recording time period of a peak in target data. For example, if an operator hopes to determine or monitor the presence of a particular bird, or other animal, the microprocessor may analyze the recorded data to detect a peak in the data corresponding to sounds made by that bird (e.g., the bird may be most vocal shortly after dawn). The controller 304 may then program the timer 302 to implement a recording window around the time of the detected peak. The microprocessor may repeatedly analyze data after each (or some specified number of) recording time period and signal the controller 304 to reprogram the timer 302 as needed to adjust the recording window to track movements of the peak in the target data. In this manner, the controller 304 may adjust the timing schedule responsive to the recorded data. It is to be appreciated that although this example has been explained in terms of monitoring the sound of a bird, the invention is not so limited, and the controller 304 may implement a sampling heuristic based on any type of recorded data.

Referring again to FIGS. 3 and 4, it is to be appreciated that the regulator 303 may be replaced with any solid state power switch such as a transistor. Alternatively, the regulator 303 may be replaced with a relay. However, relays are less efficient and therefore, may not be presently preferred in some applications. Additionally, the regulator 303 may include several individual regulators providing power to different portions of the controller 304, data recorder 305, or integrated controller and data recorder 401. It is further to be appreciated that the microprocessor used in any of the controller 304, data recorder 305, or integrated controller and data recorder 401 may take many forms including a microcontroller or a digital signal processor with integrated peripherals. In addition, it is to be appreciated that at least parts of the power regulator 303 and/or digital data interface 306 may be integrated with the microprocessor, such that most of the system can be powered down while the timer 302 continues to run. In one such example, the timer 302 or manual switch 307 can be configured to cause an interrupt resulting in power to the microprocessor being restored.

According to one embodiment, the timer 302 may include an oscillator circuit to provide a periodic clock signal for keeping time and scheduling. The controller 304 and/or the data recorder 305 (or the integrated controller and data recorder 401) may also require one or more periodic clock signals to provide timing to a microprocessor. In many cases, the desired clock frequency for microprocessors and data acquisition systems may be substantially higher than the clock frequency required for the timer 302 used for scheduling. For example, the controller and/or data recorder may use a 24 MHz oscillator and the timer 302 may use a 32 KHz oscillator. In one embodiment, the controller and/or data recorder may be configured to allow real-time streaming of quality audio to be formatted and stored on the storage media of the data recorder using a 24 MHz oscillator, which is a substantially lower frequency oscillator than what might be used in conventional systems (which use, for example, 200 MHz or higher oscillators). Higher frequency oscillators generally consume more power than low frequency oscillators. Therefore, configuring the controller and/or data recorder to operate using a relatively low frequency oscillator may provide significant power savings.

Figure 2:
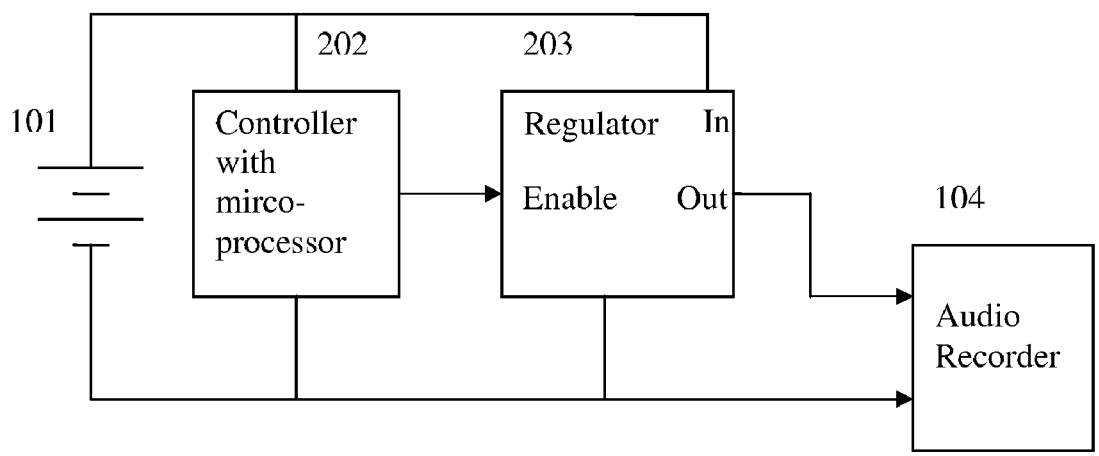
FIG. 2 is a block diagram of another example of a conventional data collection device.

In addition, in one presently preferred embodiment, the system may employ different oscillators to provide clock signals to timer 302 and to the controller 304 and/or data recorder 305 or the integrated controller and data recorder 401. As discussed above, even though the controller and/or data recorder may be configured to use a lower frequency oscillator than conventional systems, the timer 302 may run on an even lower frequency oscillator. Thus, by using different oscillators for different parts of the system, the higher frequency oscillators used for the controller and/or data recorder may be powered down during idle periods of the system, while a lower frequency oscillator used for the timer 302 continues to run. In this manner, additional power savings may be achieved during the idle periods as only a very low frequency (e.g., about 32.768 KHz compared to several MHz or hundreds of MHz), and thus very low power, oscillator may run during the idle periods. By contrast, idling a microprocessor, as is done in conventional systems (particularly those that use a microprocessor-based timer to control scheduling, such as the system of FIG. 2 discussed above) still consumes relatively high power because a fast oscillator must be powered during the idle periods.

Thus, aspects and embodiments of the invention may provide an efficient, low-power, highly flexible data recording system. By using a programmable timer 302 and separate oscillators for different parts of the system, a flexible recording schedule may be implemented in a system that is power-efficient because higher power components (including those that use faster oscillators) can be powered down during idle (non-recording) periods.

Having thus described several aspects of at least one embodiment, it is to be appreciated various alterations, modifications, and improvements will readily occur to those skilled in the art. For example, the data recorder 305 may be replaced by another device that receives power from the power regulator. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. An apparatus for autonomous data recording comprising:
   a programmable timer having a programming interface and an alarm output;
   a power regulator having an enable input coupled to the alarm output, a power input and a power output;
   a power source coupled to the power input of the regulator;
   a controller coupled to the power output of the power regulator and to the programming interface of the programmable timer; and
   a data recorder coupled to the power output of the power regulator;

wherein the regulator has an operating state in which power is provided at the power output and an idle state; and wherein the power regulator is activated into the operating state by activation of the alarm output and deactivated into the idle state by deactivation of the alarm output.

2. The apparatus of claim 1, wherein the data recorder is an audio recorder.

3. The apparatus of claim 2, wherein the controller is configured to program the programmable timer, via the programming interface, to deactivate the alarm signal for a predetermined period of time.

4. The apparatus of claim 3, further comprising a switch coupled between the power regulator and the programmable timer, the switch having an on position and an off position and being configured to activate the enable input of the regulator when in the on position.

5. The apparatus of claim 1, wherein the controller comprises a microprocessor.

6. The apparatus of claim 5, wherein the microprocessor is shared between the controller and the data recorder.

7. The apparatus of claim 5, wherein the controller comprises a first oscillator having a first operating frequency; wherein the timer comprises a second oscillator having a second operating frequency; and wherein the first operating frequency is higher than the second operating frequency.

8. The apparatus of claim 1, wherein the programmable timer is a single-stage timer.

9. The apparatus of claim 1, wherein the programmable timer is a multi-stage timer.

10. The apparatus of claim 9, wherein the controller is configured to program the multi-stage timer to implement a multi-stage timing schedule including a first stage in which the controller is configured to program the programmable timer, via the programming interface, to deactivate the alarm signal for a first predetermined period of time, and a second stage in which the controller is configured to program the programmable timer, via the programming interface, to deactivate the alarm signal for a second predetermined period of time.

11. A method of controlling a data recorder including a controller, a power regulator and a timer, the method comprising:
   programming the timer to activate the power regulator for a predetermined recording time period;
   providing power from the power regulator to the controller during the predetermined recording time period; and
   powering down the controller when the predetermined recording time period expires by deactivating the power regulator.

12. The method of claim 11, wherein programming the timer includes programming the timer with the controller.

13. The method of claim 12, further comprising providing power from the power regulator to a recording device during the predetermined recording time period.

14. The method of claim 13, further comprising recording data with the recording device during the predetermined recording time period.

15. The method of claim 12, wherein programming the timer includes adjusting the predetermined recording time period.

16. An apparatus comprising:
   a programmable timer having a programming interface and an alarm output;
   a power regulator having an enable input coupled to the alarm output, a power input and a power output;
   a power source coupled to the power input of the regulator;
   a controller coupled to the power output of the power regulator and to the programming interface of the programmable timer, the controller being configured to receive operating power from the power regulator; and
   a powered device coupled to the power output of the power regulator and configured to receive power from the power regulator;
   wherein the regulator has an operating state in which the operating power is provided at the power output and an idle state in which the operating power is not provided at the power output;
   wherein the power regulator is activated into the operating state by activation of the alarm output and deactivated into the idle state by deactivation of the alarm output; and
   wherein the controller is configured to program the programmable timer, via the programming interface, to deactivate the alarm signal for a predetermined period of time.

17. A method of powering a device including a controller, a power regulator and a timer, the method comprising:
   programming the timer with the controller to activate the power regulator for a predetermined active time period;
   providing power from the power regulator to the controller during the predetermined active time period;
   providing power from the power regulator to the device during the predetermined active time period; and
   powering down the controller and the device when the predetermined active time period expires by deactivating the power regulator.

18. The method of claim 17, wherein providing power from the power regulator to the device includes providing power to a data recorder during the predetermined active time period.

19. The method of claim 18, further comprising recording data with the data recorder during the predetermined active time period to provide recorded data.

20. The method of claim 19, further comprising analyzing the recorded data to determine information; and adjusting at least one of a duration and a start time of the predetermined active time period responsive to the information.

* * * * *